US012683484B2

(12) United States Patent
Koyama et al.

(10) Patent No.: US 12,683,484 B2
(45) Date of Patent: Jul. 14, 2026

(54) POWER CONVERSION DEVICE AND REFRIGERATION APPARATUS

(71) Applicant: DAIKIN INDUSTRIES, LTD., Osaka (JP)

(72) Inventors: Yoshitsugu Koyama, Osaka (JP); Kodai Okuzono, Osaka (JP); Masaki Kono, Osaka (JP); Reiji Kawashima, Osaka (JP); Hirotaka Doi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 230 days.

(21) Appl. No.: 18/683,474

(22) PCT Filed: Sep. 28, 2022

(86) PCT No.: PCT/JP2022/036252
§ 371 (c)(1),
(2) Date: Feb. 13, 2024

(87) PCT Pub. No.: WO2023/054508
PCT Pub. Date: Apr. 6, 2023

(65) Prior Publication Data
US 2024/0356432 A1     Oct. 24, 2024

(30) Foreign Application Priority Data

Sep. 30, 2021     (JP) ................................. 2021-162109

(51) Int. Cl.
*H02M 1/12* (2006.01)
*H02M 7/217* (2006.01)

(52) U.S. Cl.
CPC ........... *H02M 1/126* (2013.01); *H02M 7/217* (2013.01); *H02M 1/123* (2021.05)

(58) Field of Classification Search
CPC .............................. H02M 1/123; H02M 1/126
See application file for complete search history.

(56) References Cited

U.S. PATENT DOCUMENTS 5,831,842 A * 11/1998 Ogasawara ............. H02M 1/12
363/40
6,151,228 A 11/2000 Miyazaki et al.
(Continued)

FOREIGN PATENT DOCUMENTS

EP     3 576 279 A1     12/2019
JP     5-300757 A     11/1993
(Continued)

OTHER PUBLICATIONS

Extended European Search Report for European Application No. 22876374.4, dated Dec. 19, 2024.
(Continued)

*Primary Examiner* — Gary A Nash
(74) *Attorney, Agent, or Firm* — Birch, Stewart, Kolasch & Birch, LLP

(57) ABSTRACT

A power conversion device includes: a power converter using a switching element; and a noise reduction circuit, the noise reduction circuit including: a noise detector configured to detect a common mode noise current or a common mode noise voltage generated in a power line in response to operation of the power converter; an amplifier configured to generate a compensation current based on a detection signal from the noise detector; and an output circuit configured to output the compensation current generated by the amplifier to the power line. A power conversion board carrying the power converter and a canceler board carrying the amplifier are different boards.

12 Claims, 11 Drawing Sheets

(56) References Cited

U.S. PATENT DOCUMENTS

| | | | | |
|---|---|---|---|---|
| 2002/0075702 A1* | 6/2002 | Igarashi | ................. | H02M 1/12 |
| | | | | 363/35 |
| 2004/0008527 A1* | 1/2004 | Honda | .................... | H02M 1/12 |
| | | | | 363/39 |
| 2017/0047881 A1 | 2/2017 | Shimura et al. | | |
| 2017/0288567 A1* | 10/2017 | Taguchi | ................. | F04B 39/02 |
| 2020/0083835 A1* | 3/2020 | Kobayashi | .......... | H02M 5/4585 |

FOREIGN PATENT DOCUMENTS

| | | | |
|---|---|---|---|
| JP | 11-122910 A | 4/1999 |
| JP | 3044650 B2 | 5/2000 |
| JP | 2001-143886 A | 5/2001 |
| JP | 2010-259247 A | 11/2010 |
| JP | 2013-158085 A | 8/2013 |
| JP | 2017-38500 A | 2/2017 |
| JP | 2018-148671 A | 9/2018 |
| JP | 2021-5982 A | 1/2021 |

OTHER PUBLICATIONS

Japanese Submission form of Publications for Japanese Application No. 2023-070802, dated Dec. 9, 2024, with English translation.
Decision of Refusal issued for counter JP application No. 2021-162109 on Jan. 31, 2023.
International Search Report for PCT/JP2022/036252 (PCT/ISA/210), mailed on Nov. 22, 2022.
European Communication pursuant to Article 94(3) EPC for European Application No. 22 876 374.4, dated Aug. 21, 2025.
Kundert, "Power Supply Noise Reduction," The Designers Guide Community, vol. 4, Jan. 4, 2004, XP002653105, pp. 1-12.

* cited by examiner

POWER CONVERSION DEVICE AND REFRIGERATION APPARATUS

TECHNICAL FIELD

The present disclosure relates to a power conversion device and a refrigeration apparatus.

BACKGROUND ART

Patent Literature 1 discloses a noise reduction device for a power conversion device, where an electric motor as a load is connected to an inverter device consisting of an AC power supply, a rectifier circuit, a smoothing capacitor, and an inverter circuit, a leakage current detector is connected between the AC power supply and the rectifier circuit, an NPN first transistor is connected between one end of the smoothing capacitor and a case of the electric motor, a PNP second transistor is connected between the case of the electric motor and the other end of the smoothing capacitor, and the first and second transistors are driven by output of the leakage current detector to inject a current to cancel common mode noise.

CITATION LIST

Patent Literature

Patent Literature 1: Japanese Patent No. 3044650

SUMMARY OF INVENTION

Technical Problem

It will be typical to mount, on the same board, a power converter that uses a switching element and an amplifier that generates a compensation current based on detection signals of common mode noise occurring in the power line in response to operation of the power converter. However, such a mounting method may carry the risk of degrading the compensation performance for common mode noise due to switching noise of the power converter riding on common mode noise detection signals.

It is an object of the present invention to prevent degradation of the compensation performance for common mode noise that may otherwise be caused by switching noise of the power converter riding on common mode noise detection signals.

Solution to Problem

A power conversion device according to the present disclosure includes: a power converter using a switching element; and a noise reduction circuit, the noise reduction circuit including: a noise detector configured to detect a common mode noise current or a common mode noise voltage generated in a power line in response to operation of the power converter; an amplifier configured to generate a compensation current based on a detection signal from the noise detector; and an output circuit configured to output the compensation current generated by the amplifier to the power line. A power conversion board carrying the power converter and a canceler board carrying the amplifier are different boards.

This power conversion device can inhibit degradation of the compensation performance for common mode noise that may otherwise be caused by switching noise of the power converter riding on a common mode noise detection signal.

The power conversion device according to the present disclosure may include a power terminal block for connection to an AC power supply, and the noise detector may be located closer to the power terminal block than to the power conversion board.

This arrangement increases the effect of common mode noise compensation.

The power conversion device according to the present disclosure may include a power terminal block for connection to an AC power supply, and the canceler board may be located closer to the power terminal block than to the power conversion board.

This arrangement can compensate for common mode noise while reducing the influence of heat from the power converter.

The power conversion device according to the present disclosure may include a noise filter between the noise reduction circuit and the power converter.

This arrangement can reduce switching noise from the power converter.

The power conversion device according to the present disclosure may include a housing accommodating the power conversion board and the canceler board, the housing including a ground terminal for connection to a ground wire and a conductive portion having a same potential as the ground terminal, and a compensation path connection terminal, which is a terminal for output of a compensation current from the noise reduction circuit, and a ground terminal of the noise filter may be separately connected to the conductive portion of the housing.

This arrangement can inhibit entry of noise from the current collected by the noise filter into the compensation current.

A terminal on the housing for connection to the compensation path connection terminal may be located closer to the ground terminal of the housing than a terminal on the housing for connection to the ground terminal of the noise filter is.

This arrangement can reduce the impedance of the compensation path.

Another power converter may be connected to a load side of the noise filter in parallel with the power converter.

This arrangement can cancel switching noise from other power converters all together.

The noise filter may be mounted on the canceler board.

This arrangement can reduce the impedance of the compensation path.

Power supply for the noise reduction circuit may be supplied from another board to the canceler board, and a noise reduction element may be provided on a path for the power supply.

This arrangement can inhibit the outflow of switching noise of the power converter to the outside through the noise canceler.

Power supply for the noise reduction circuit may be supplied from another board to the canceler board.

This arrangement can reduce the cost of operating the noise reduction circuit.

The noise detector may be a detection core configured to detect the common mode noise current.

This arrangement can directly amply the detected common mode noise current to compensate for the common mode noise.

A refrigeration apparatus according to the present disclosure includes the power conversion device according to any one of the above aspects.

This refrigeration apparatus can inhibit degradation of compensation performance for common mode noise that may otherwise be caused by switching noise of the power converter riding on the common mode noise detection signal.

DESCRIPTION OF EMBODIMENTS

Exemplary embodiments will be described below with reference to the appended drawings.

First Embodiment

Figure 1A:
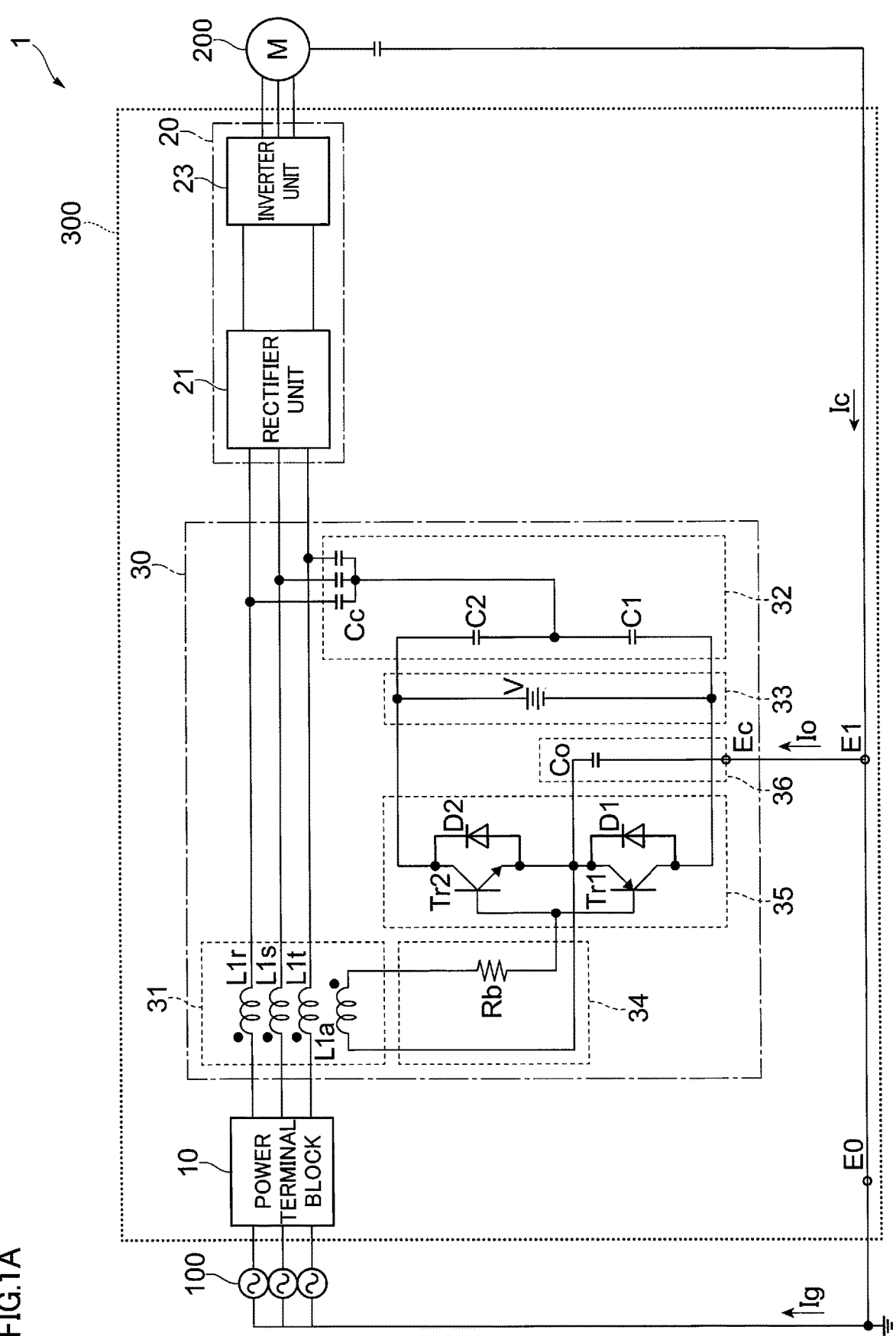
FIG. 1A illustrates a circuit configuration of a power conversion system according to a first embodiment.

FIG. 1A illustrates a circuit configuration of a power conversion system 1 according to a first embodiment. As shown, the power conversion system 1 includes an AC power supply 100, a motor 200, and a power conversion device 300.

The AC power supply 100 is, for example, a three-phase three-wire commercial AC power supply and supplies AC to the power conversion device 300. The first through third phases are herein denoted as R-, S-, and T-phases, respectively. Power lines supplying the R-, S-, and T-phases are denoted as R-, S-, and T-phase power lines, respectively. These power lines may be simply denoted as "power lines" when a distinction between the phases is not necessary. While the following description discusses the use of the three-phase three-wire AC, a similar concept can be applied to the use of three-phase four-wire AC or single-phase AC.

The motor 200 is connected to the power conversion device 300 and controlled by the three-phase AC as a load. The motor 200 may be, for example, a DC brushless motor. Alternatively, the motor 200 may be any other three-phase AC motor.

The power conversion device 300 includes a power terminal block 10, a power converter 20, and a noise reduction circuit 30.

The power terminal block 10 is a portion for connection to wiring used to input AC from the AC power supply 100. The power terminal block 10 has an R-phase input terminal, an S-phase input terminal, and a T-phase input terminal (all not shown). The power terminal block 10 may also include a ground terminal E0, located remote from the power terminal block 10 in the figure, for connection to an external ground wire.

The power converter 20 includes a rectifier unit 21 and an inverter unit 23. In the power converter 20, the rectifier unit 21 and the inverter unit 23 are connected in this order from the AC power supply 100 side. The inverter unit 23 is connected to the motor 200.

The rectifier unit 21 rectifies the AC supplied from the AC power supply 100 into DC. The inverter unit 23 converts the DC output from the rectifier unit 21 into three-phase AC and supplies it to the motor 200. The inverter unit 23 includes a switching element (not shown). For example, the switching element may be an insulated gate bipolar transistor (IGBT). A smoothing unit to smooth the DC output from the rectifier unit 21 may be provided between the rectifier unit 21 and the inverter unit 23.

The noise reduction circuit 30 is an active common mode noise reduction circuit that detects common mode noise and performs feedback control to suppress it. The noise reduction circuit 30 includes a noise detection unit 31, a coupling capacitor unit 32, a DC power supply unit 33, a detection circuit 34, an amplifier 35, and an output capacitor unit 36.

The noise detection unit 31 detects a common mode noise current. An example of the noise detection unit 31 is a detection core. The detection core may include conductive wires to be passed through the toroidal core. However, the example here describes the detection core that includes coils (winding wires) L1$r$, L1$s$, L1$t$, and L1$a$.

The coils L1$r$, L1$s$, and L1$t$ are connected in series to the respective R-, S-, and T-phase power lines. Here, the coil refers to a conductive wire wound in a helical (loop) shape to form an inductor.

These coils L1$r$, L1$s$, and L1$t$ are conductive wires (wires) that form part of the power lines and are wound around a single toroidal core. The toroidal core is, for example, composed of a magnetic material such as an annular (doughnut-shaped) ferrite with a circular cross-section. The toroidal core may also be called an iron core. The toroidal core does not need to be annular, and may be of a polygonal frame shape such as a square or triangle. The cross-sectional shape may also be square, triangular, etc.

The coils L1$r$, L1$s$, and L1$t$ are wound around the single toroidal core such that they are adjacent to each other. Accordingly, the coils L1$r$, L1$s$, and L1$t$ are magnetically coupled (have magnetic coupling) with each other. The coils L1$r$, L1$s$, and L1$t$ are wound to have the polarity indicated by the dots "•" in FIG. 1A.

The coil L1$a$ is provided to be magnetically coupled (have magnetic coupling) with the coils L1$r$, L1$s$, and L1$t$. For example, the coil L1$a$ is wound around the single toroidal core such that it is adjacent to the coils L1$r$, L1$s$, and L1$t$. Alternatively, the coil L1$a$ may be wound to overlap the coils L1$r$, L1$s$, and L1$t$ that are wound around the single toroidal core such that they are adjacent to each other. The coil L1$a$ is wound to have the polarity indicated by the dot "•" in FIG. 1A.

The coils L1$r$, L1$s$, L1$t$, and L1$a$ are wound such that, when a current flows through the coils L1$r$, L1$s$, and L1$t$ in the right direction in the figure for example, the current flows through the coil L1$a$ in the left direction in the figure.

Accordingly, the polarity indicated by the dots "•" as described above is the polarity according to the direction in which the current flows.

A common mode noise current is a high-frequency current that leaks to ground through the stray capacitance of the motor 200 and other components due to the switching of a switching element St in the inverter unit 23. Accordingly, the common mode noise current flows between the R-, S-, and T-phase power lines and the ground.

When a common mode noise current flows through the coils L1r, L1s, and L1t, a current proportional to the common mode noise current is induced in the coil L1a through the toroidal core. In this case, the coils L1r, L1s, and L1t as well as the coil L1a function as a current transformer and constitute a detection transformer to detect the common mode noise current.

The coupling capacitor unit 32 includes a coupling capacitor Cc and capacitors C1 and C2. The capacitors C1 and C2 are connected in series and connected in parallel to the DC power supply unit 33 and the amplifier 35. Three terminals of the coupling capacitor Cc on one end thereof are connected to the R-, S-, and T-phase power lines, respectively. The terminal of the coupling capacitor Cc on the other end thereof is connected to a connection point between the series-connected capacitors C1 and C2. The coupling capacitor unit 32 defines a path for flow of a compensation current between the R-, S-, and T-phase power lines and the amplifier 35 through the coupling capacitor Cc and the capacitors C1 and C2.

Figure 1B:
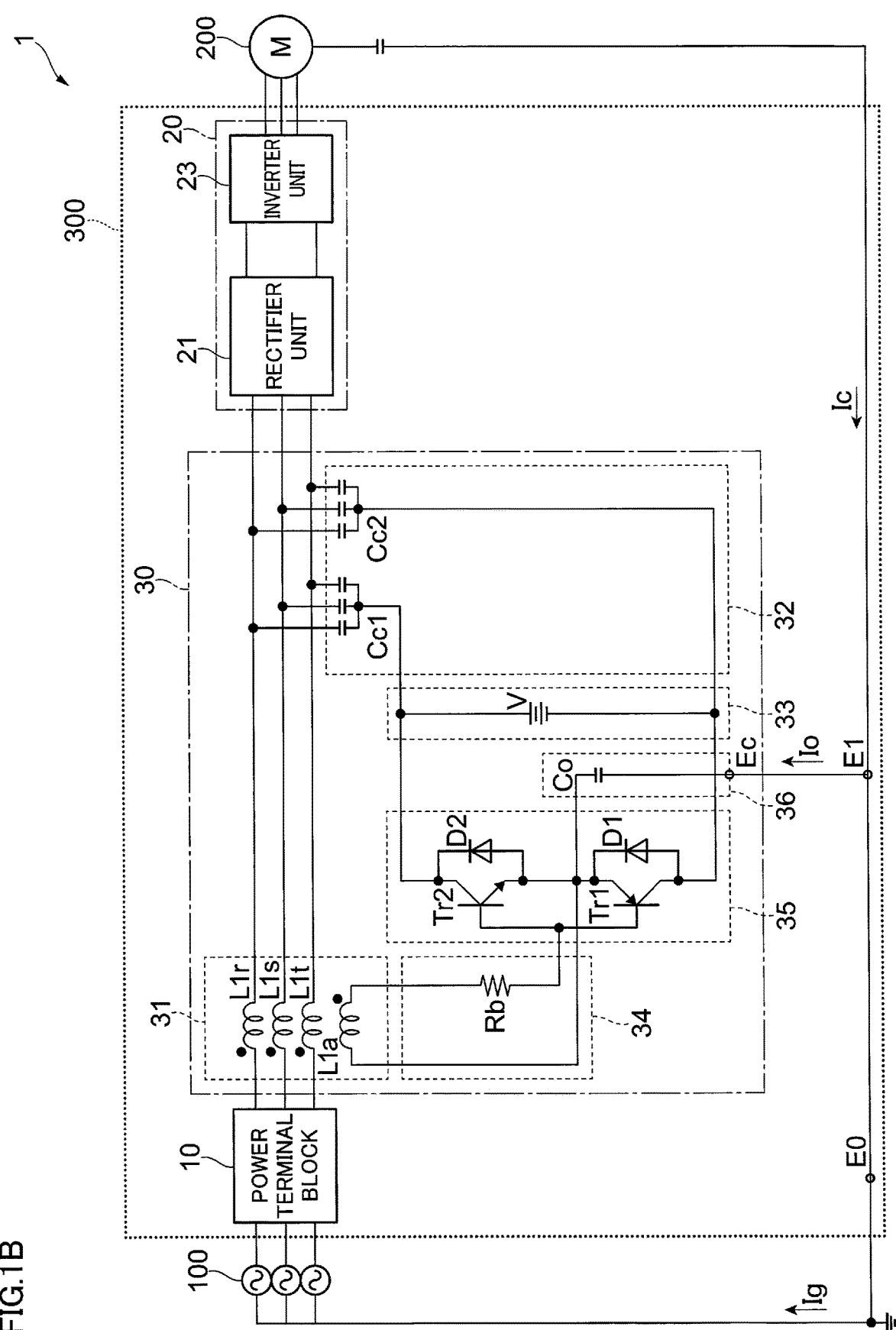
FIG. 1B illustrates a variation of the circuit configuration of the power conversion system according to the first embodiment.
Figure 2:
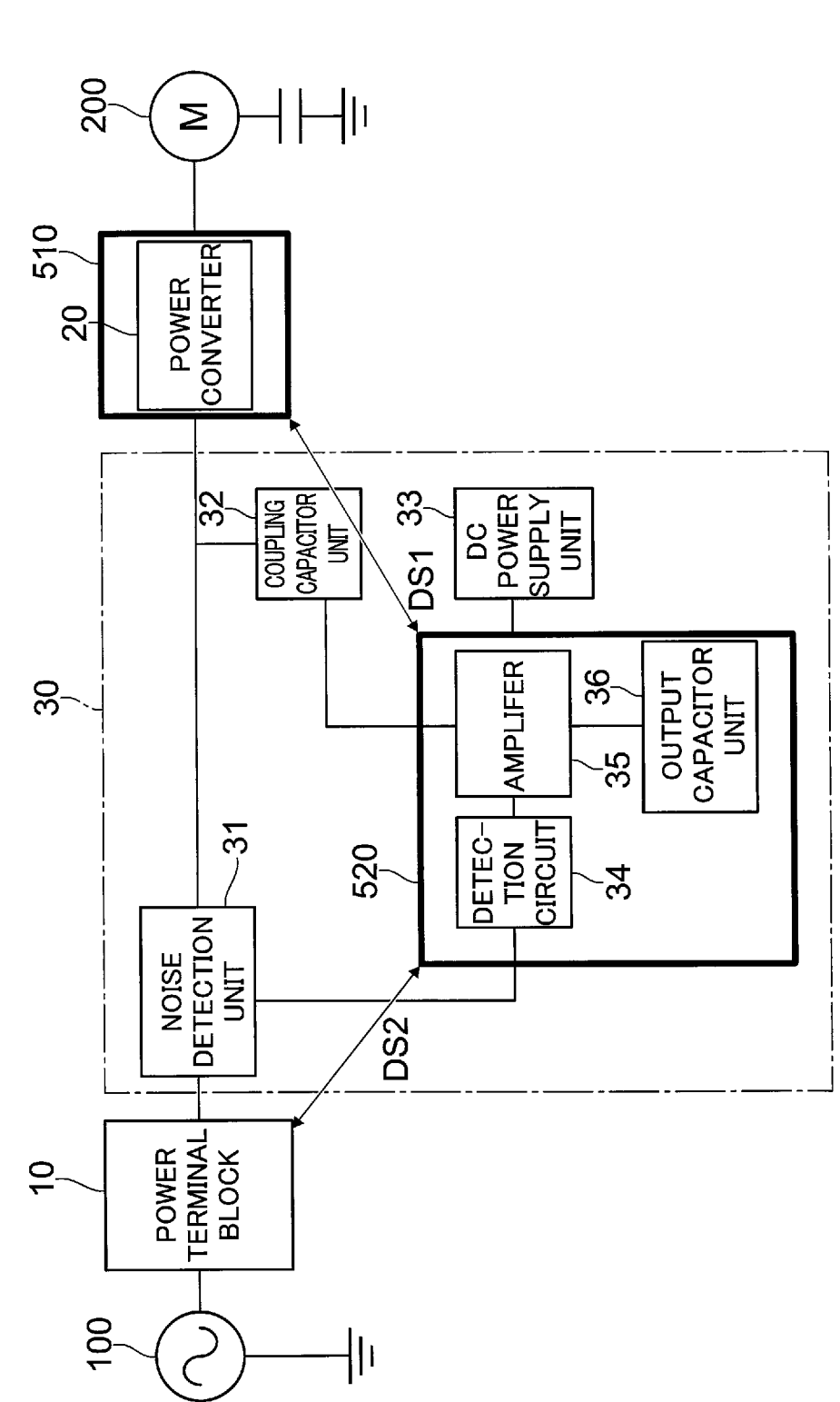
FIG. 2 illustrates a schematic configuration of the power conversion system according to the first embodiment.

Alternatively, the coupling capacitor unit 32 may include coupling capacitors Cc1 and Cc2, as shown in FIG. 1A, 1B and 2. In this case, three terminals of the coupling capacitor Cc1 on one end thereof are connected to the R-, S-, and T-phase power lines, respectively, and the terminal of the coupling capacitor Cc1 on the other end thereof is connected to the DC power supply unit 33 and the amplifier 35. Three terminals of the coupling capacitor Cc2 on one end thereof are connected to the R-, S-, and T-phase power lines, respectively, and the terminal of the coupling capacitor Cc2 on the other end thereof is connected to the DC power supply unit 33 and the amplifier 35.

The DC power supply unit 33 includes a DC power supply V. The DC power supply V supplies a DC voltage to the amplifier 35.

The detection circuit 34 includes a base resistor Rb. The base resistor Rb is a resistor for limiting the base current flowing through the amplifier 35. Here, the circuit connected between the connection point of the detection core and the base resistor Rb is defined as the detection circuit.

The amplifier 35 includes first and second transistors Tr1 and Tr2, which are examples of the first and second current control elements, and first and second diodes D1 and D2.

The first transistor Tr1 is connected between one end of the DC power supply V and the output capacitor unit 36. The second transistor Tr2 is connected between the other end of the DC power supply V and the output capacitor unit 36. The first transistor Tr1 is of a PNP type and the second transistor Tr2 is of an NPN type, and the first and second transistors Tr1 and Tr2 have mutually opposite polarity. The bases (control terminals) of the first and second transistors Tr1 and Tr2 are connected to one output line of the coil L1a, and the interconnection points of the first and second transistors Tr1 and Tr2 are connected to the other output line of the coil L1a. This causes the first and second transistors Tr1 and Tr2 to operate opposite each other.

The first and second diodes D1 and D2 are connected in reverse parallel to the first and second transistors Tr1 and Tr2 to protect them. Note that the first and second diodes D1 and D2 may be eliminated.

In this example, the amplifier 35 includes the transistors. However, the amplifier 35 may include operational amplifiers rather than the transistors.

The output capacitor unit 36 includes an output capacitor Co. The output capacitor Co is connected on its one end to a connection point of the first and second transistors Tr1 and Tr2 on the emitter side, and is connected on its other end to a ground terminal E1 of the housing via a compensation path connection terminal Ec. Other implementations are also possible where the output capacitor unit 36 is absent or the output capacitor unit 36 includes, in addition to the output capacitor Co, a resistor directly connected to the output capacitor Co. Still alternatively, an implementation is possible where the output capacitor unit 36 is connected to the power lines and the DC power supply unit 33 is connected to the ground either directly or via the coupling capacitor.

In the first embodiment, the detection circuit 34, the amplifier 35, and the output capacitor unit 36 constitute a noise canceler.

The operation of the power conversion system 1 according to the first embodiment will now be described.

The commercial AC power supply 100 supplies an AC voltage to the power converter 20 via the power terminal block 10. In the power converter 20, the rectifier unit 21 rectifies the AC voltage supplied from the AC power supply 100 to a DC voltage. The inverter unit 23 supplies an AC voltage to the motor 200 through on/off control of the switching element.

In this case, a common mode noise current Ic flows from the motor 200 every time a pulsed voltage is applied from the inverter unit 23, as shown in the figure. The noise detection unit 31 detects the common mode noise current in the power lines input to the power converter 20 and drives the first and second transistors Tr1 and Tr2. In response to a detection current from the noise detection unit 31 flowing into the bases of the first and second transistors Tr1 and Tr2, this current is amplified by the first and second transistors Tr1 and Tr2.

When the first transistor Tr1 is on (when a positive common mode noise current Ic is generated), a compensation current Io is supplied from the DC power supply V and flows along a current path (compensation path) that runs from the positive terminal of the DC power supply V through the capacitor C2, the coupling capacitor Cc, the AC power supply 100, the output capacitor Co, and the first transistor Tr1 to the negative terminal of the DC power supply V. In this case, the common mode noise current Ic, the compensation current Io, and a post-compensation common mode noise current Ig flow in the direction of the arrows in the figure. The compensation current Io reduces the common mode noise current Ic by being subtracted from the common mode noise current Ic from the motor 200. In other words, the compensation current Io compensates for the common mode noise current Ic.

When the second transistor Tr2 is on (when a negative common mode noise current Ic is generated), the compensation current Io is supplied from the DC power supply V and flows along a current path (compensation path) that runs from the positive terminal of the DC power supply V through the second transistor Tr2, the output capacitor Co, the AC power supply 100, the coupling capacitor Cc, and the capacitor C1 to the negative terminal of the DC power supply V. In this case, the common mode noise current Ic, the compensation current Io, and the post-compensation common mode noise current Ig flow in the direction opposite the arrows in the figure. The negative compensation current Io reduces the common mode noise current Ic by being subtracted from the negative common mode noise current Ic from the motor 200. In other words, the compensation current Io compensates for the common mode noise current Ic.

As described above, in both cases when the first transistor Tr1 is on and when the second transistor Tr2 is on, the post-compensation common mode noise current Ig flows in the AC power supply 100.

In the first embodiment, the noise detection unit 31 detects the common mode noise current. Alternatively, the noise detection unit 31 may detect a common mode noise voltage. In such a case, the noise reduction circuit 30 may estimate the common mode noise current flowing through the path based on the common mode noise voltage detected by the noise detection unit 31 and apply a compensation current to cancel that common mode noise current.

FIG. 2 illustrates a schematic configuration of the power conversion system 1 according to the first embodiment.

In the first embodiment, as shown in the figure, a power conversion board 510 carrying the power converter 20 and a canceler board 520 carrying the detection circuit 34, the amplifier 35, and the output capacitor unit 36 are different boards.

Thus, in the first embodiment, the inverter unit 23, which is the source of the switching noise, and the noise canceler are mounted on different boards, so that the inverter unit 23 and the noise canceler are distanced from each other. This arrangement reduces switching noise of the inverter unit 23 riding on the common mode noise detection signal, allowing for stable operation of the noise canceler. This arrangement also reduces switching noise of the inverter unit 23 riding on the compensation current, improving the compensation performance.

Active noise cancelers compensate for a detection signal by amplifying it, so that they are more sensitive to disturbance noise. Thus, they will more benefit from the separation of the boards than ordinary passive noise filters.

Furthermore, the first embodiment provides greater flexibility in mounting positions, allowing for configuration of low-impedance compensation paths. In addition, the same noise reduction circuit 30 can be used regardless of specifications of the power conversion board 510 (input power supply voltage, load capacitance, etc.), which can reduce costs.

While the noise detection unit 31, the coupling capacitor unit 32, and the DC power supply unit 33 are depicted as being not mounted on the canceler board 520, the noise detection unit 31, the coupling capacitor unit 32, and the DC power supply unit 33 may be mounted on the canceler board 520. Also, while the detection circuit 34 and the output capacitor unit 36 are depicted as being mounted on the canceler board 520, the detection circuit 34 and the output capacitor unit 36 may not be mounted on the canceler board 520. At least the amplifier 35 may be mounted on the canceler board 520.

In the first embodiment, the noise detection unit 31 is located closer to the power terminal block 10 than to the power conversion board 510, as shown in the figure.

In the first embodiment, by locating the noise detection unit 31 close to the power terminal block 10 in this manner, the common mode noise can be compensated for at the power terminal block 10. This increases the effect of common mode noise compensation.

Furthermore, in the first embodiment, the canceler board 520 is located closer to the power terminal block 10 than to the power conversion board 510, as shown in the figure. Specifically, the power conversion board 510 and the canceler board 520 are located such that that the distance DS2 in the figure is shorter than the distance DS1 in the figure.

In the first embodiment, by locating the canceler board 520 remote from the power converter 20 in this manner, the influence of heat from the power conversion board 510 on the canceler board 520 can be reduced. This allows for stable operation of the noise canceler.

When the power supply for the noise canceler is lowered to a lower voltage, the impedance of the compensation path needs to be reduced to allow for passage of sufficient compensation current. Locating the noise canceler close to the power terminal block can reduce the impedance of the compensation path, providing a greater benefit to such a lower-voltage noise canceler.

Second Embodiment

Figure 3:
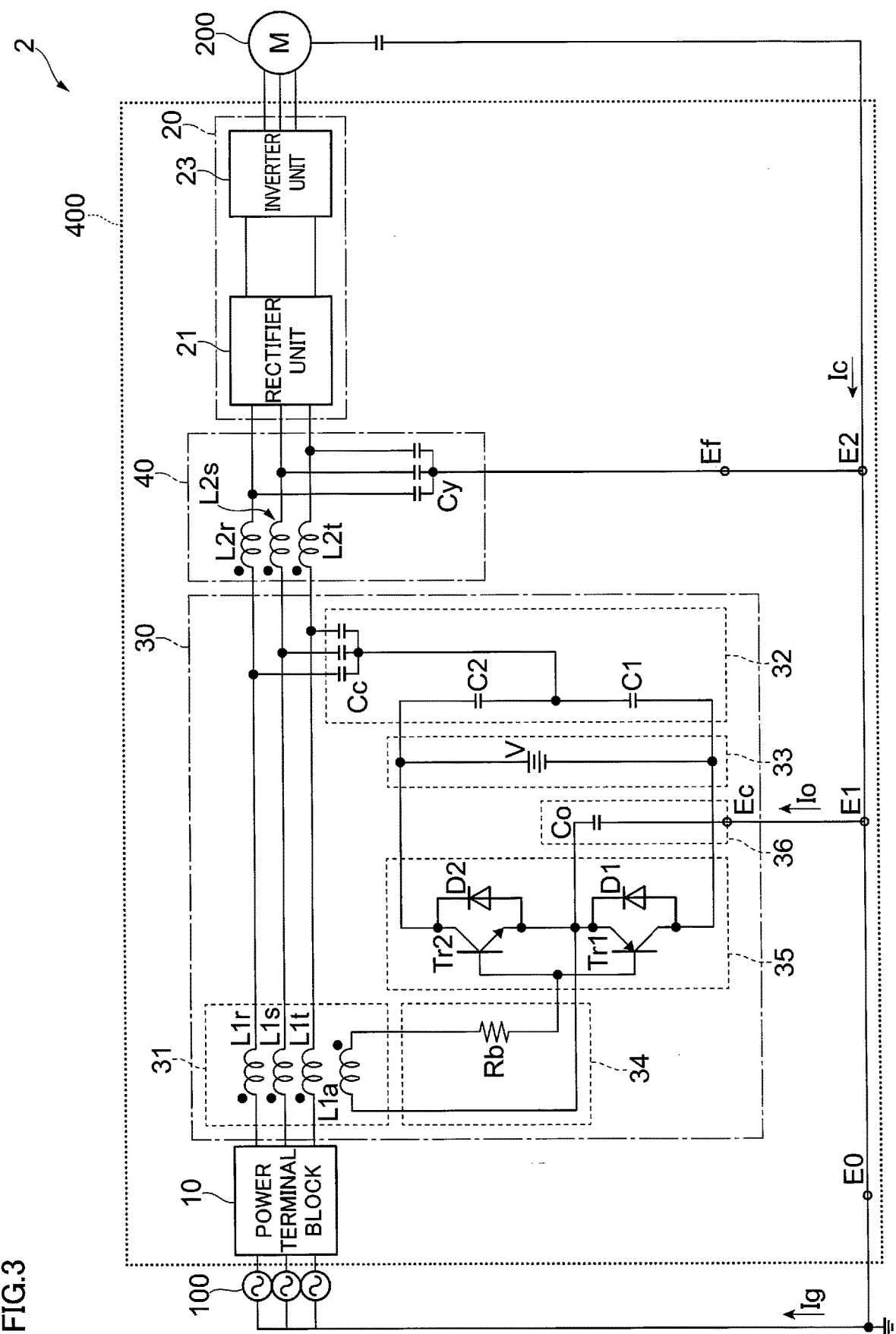
FIG. 3 illustrates a circuit configuration of a power conversion system according to a second embodiment.

FIG. 3 illustrates a circuit configuration of a power conversion system 2 according to a second embodiment. As shown in the figure, the power conversion system 2 includes the AC power supply 100, the motor 200, and a power conversion device 400.

The AC power supply 100 and the motor 200 are similar to those described in the first embodiment, so that descriptions thereof are omitted.

The power conversion device 400 includes the power terminal block 10, the power converter 20, the noise reduction circuit 30, and a noise filter 40.

The power terminal block 10, the power converter 20, and the noise reduction circuit 30 are similar to those described in the first embodiment, so that descriptions thereof are omitted.

The noise filter 40 is connected between the power converter 20 and the noise reduction circuit 30. The noise filter 40 reduces the common mode noise. The noise filter 40 includes common mode choke coils L2r, L2s, and L2t, and a Y-capacitor Cy. The common mode choke coils L2r, L2s, and L2t are a pair of coils connected to each of the R-, S-, and T-phase power lines. The Y-capacitor Cy is a capacitor provided between the R-, S-, and T-phase power lines and the ground. The Y-capacitor Cy is connected to a ground terminal E2 of the housing via a ground terminal Ef of the noise filter 40.

The operation of the power conversion system 2 in the second embodiment is similar to that of the power conversion system 1 in the first embodiment except that the noise filter 40 reduces the switching noise from the power converter 20, so that a description of the operation is omitted.

In the second embodiment, the noise detection unit 31 detects the common mode noise current. However, the noise detection unit 31 may detect a common mode noise voltage. In such a case, the noise reduction circuit 30 may estimate the common mode noise current flowing in the path based on the common mode noise voltage detected by the noise detection unit 31 and apply a compensation current to cancel that common mode noise current.

Figure 4:
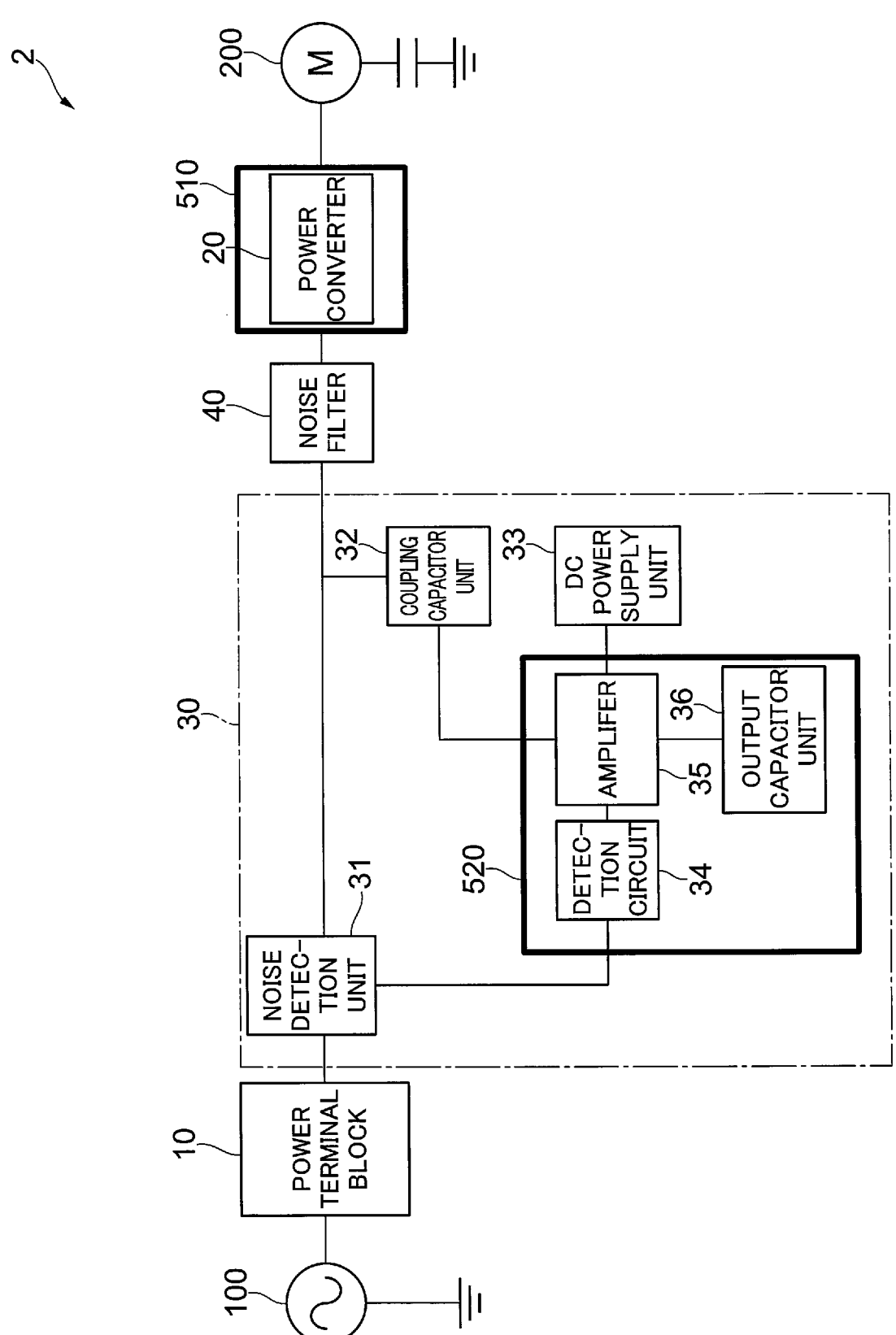
FIG. 4 illustrates a schematic configuration of the power conversion system according to the second embodiment.

FIG. 4 illustrates a schematic configuration of the power conversion system 2 according to the second embodiment.

In the second embodiment, the noise filter 40 is connected between the noise reduction circuit 30 and the power conversion board 510, as shown in the figure.

This reduces switching noise from the power converter 20, and a more stable operation of the noise canceler can be expected in the second embodiment.

While FIG. 4 depicts the noise filter 40 as being connected between the noise reduction circuit 30 and the power conversion board 510, the noise filter 40 may be connected between the noise reduction circuit 30 and the power converter 20. For example, the noise filter 40 may be mounted on the power conversion board 510.

Third Embodiment

The circuit configuration of a power conversion system 3 according to a third embodiment is the same as that of the power conversion system 2 according to the second embodiment.

Figure 5:
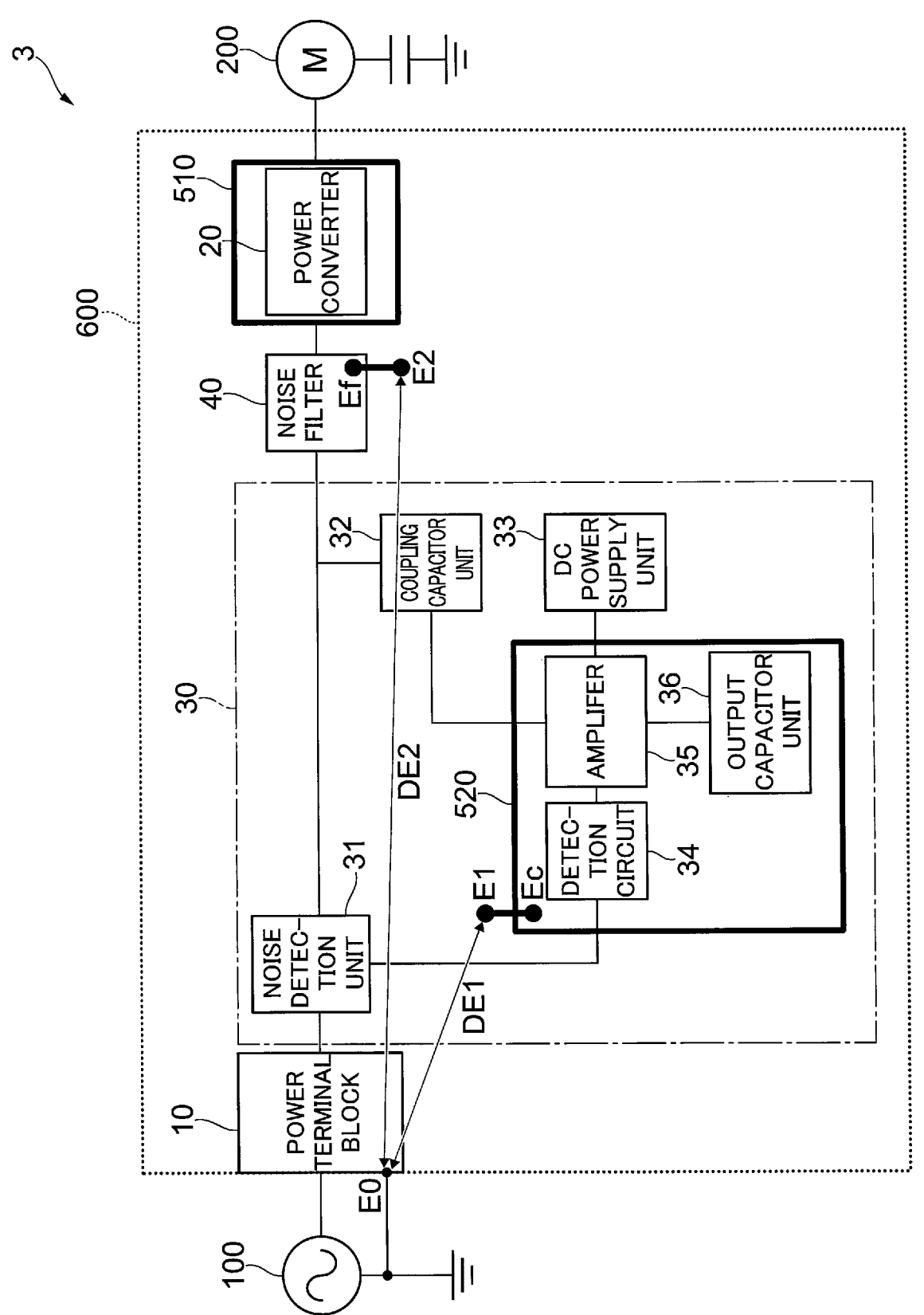
FIG. 5 illustrates a schematic configuration of a power conversion system according to a third embodiment.

FIG. 5 illustrates a schematic configuration of the power conversion system 3 according to the third embodiment.

In the third embodiment, a housing 600 is provided that accommodates the power conversion device 400, as shown in the figure. The housing 600 includes a ground terminal E0 for connection to an external ground wire. A compensation path connection terminal Ec of the canceler board 520 and a ground terminal Ef of the noise filter 40 are separately connected to the housing 600.

In this manner, the third embodiment separates the current collected by the passive noise filter 40 from the compensation current, which prevents entry of noise into the compensation current.

In the above description, the entire housing 600 is assumed to be a conductive portion that has the same potential as the ground terminal E0. However, this is not limiting. The housing 600 may partially include a conductive portion that has the same potential as the ground terminal E0. In such a case, a ground terminal E1 on the housing 600 for connection to the compensation path connection terminal Ec of the canceler board 520 and a ground terminal E2 on the housing 600 for connection to the ground terminal Ef of the noise filter 40 may be located in this conductive portion.

Additionally, in the third embodiment, the ground terminal E1 is located closer to the ground terminal E0 than the ground terminal E2 is, as shown in the figure. Specifically, the grounding terminals E1 and E2 are located such that the distance DE1 in the figure is shorter than the distance DE2 in the figure.

Thus, the third embodiment can reduce the impedance of the compensation path.

Fourth Embodiment

The circuit configuration of a power conversion system 4 according to a fourth embodiment is basically the same as that of the power conversion system 2 according to the second embodiment.

Figure 6:
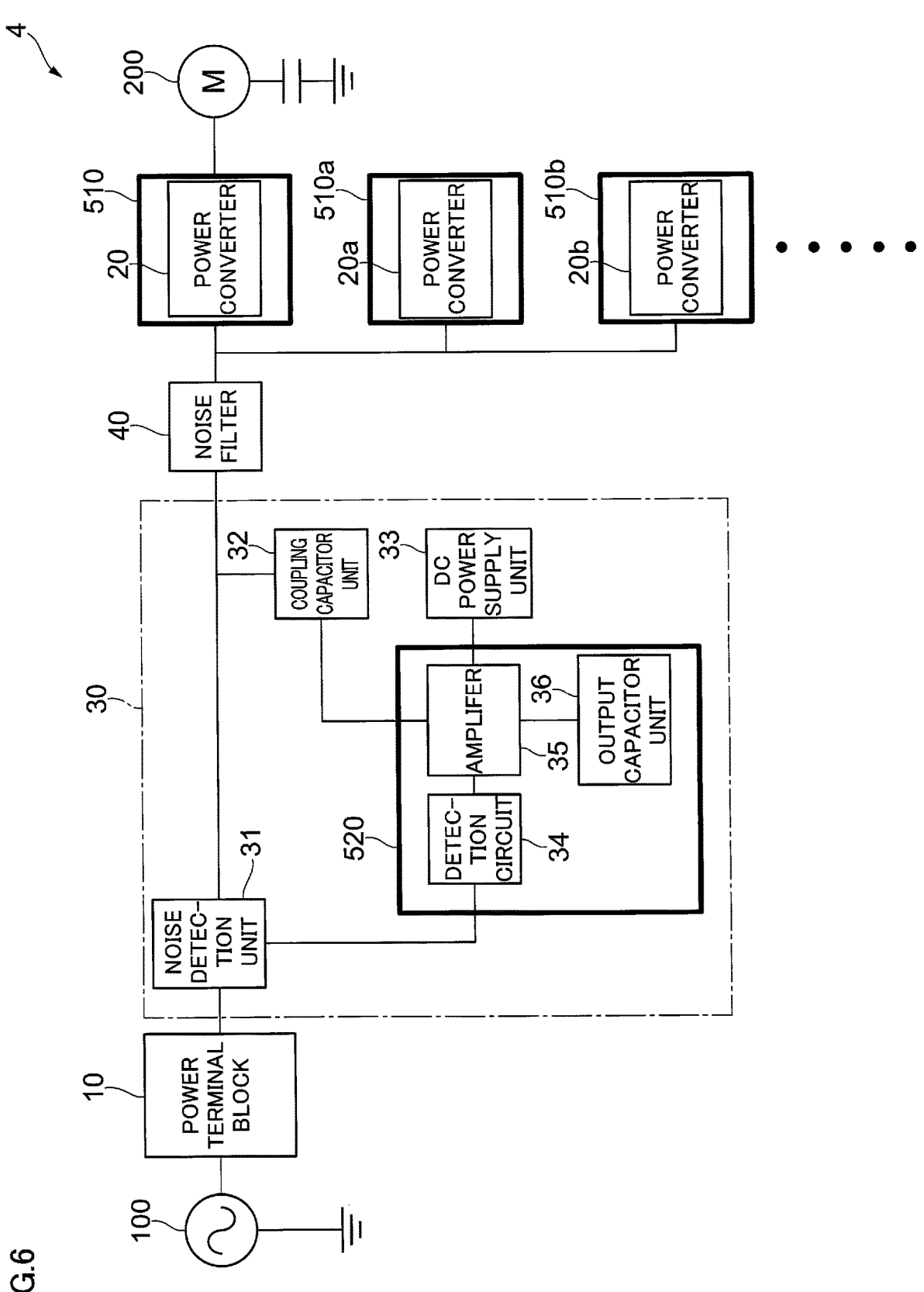
FIG. 6 illustrates a schematic configuration of a power conversion system according to a fourth embodiment.

FIG. 6 illustrates a schematic configuration of the power conversion system 4 according to the fourth embodiment.

In the fourth embodiment, in addition to the power conversion board 510, multiple power conversion boards 510a, 510b, . . . are connected in parallel to the load side of the noise filter 40, as shown in the figure. Here, the multiple power conversion boards 510a, 510b, . . . may carry power converters 20a, 20b, . . . , respectively.

Alternatively, any of the power converters 20a, 20b, . . . may be an active filter. In this case, the active filter is connected in parallel between the noise filter 40 and the power converter 20 on the power lines. The active filter reduces a harmonic current flowing out from the power converter 20 to the power lines by compensating for a harmonic current in antiphase to a harmonic current generated in the power converter 20, based on the value of a current flowing in the power converter 20 and detected by a current transformer (not shown) on the power lines.

Thus, the fourth embodiment can collectively cancel noise from the multiple power conversion boards 510.

In the above description, the multiple power conversion boards 510, 510a, 510b, . . . carry the power converters 20, 20a, 20b, . . . , respectively. However, this is not limiting. One power conversion board may carry the power converters 20, 20a, 20b, . . . . In other words, other power converters 20a, 20b, . . . may be connected to the load side of the noise filter 40 in parallel with the power converter 20.

Fifth Embodiment

The circuit configuration of a power conversion system 5 according to a fifth embodiment is the same as that of the power conversion system 2 according to the second embodiment.

Figure 7:
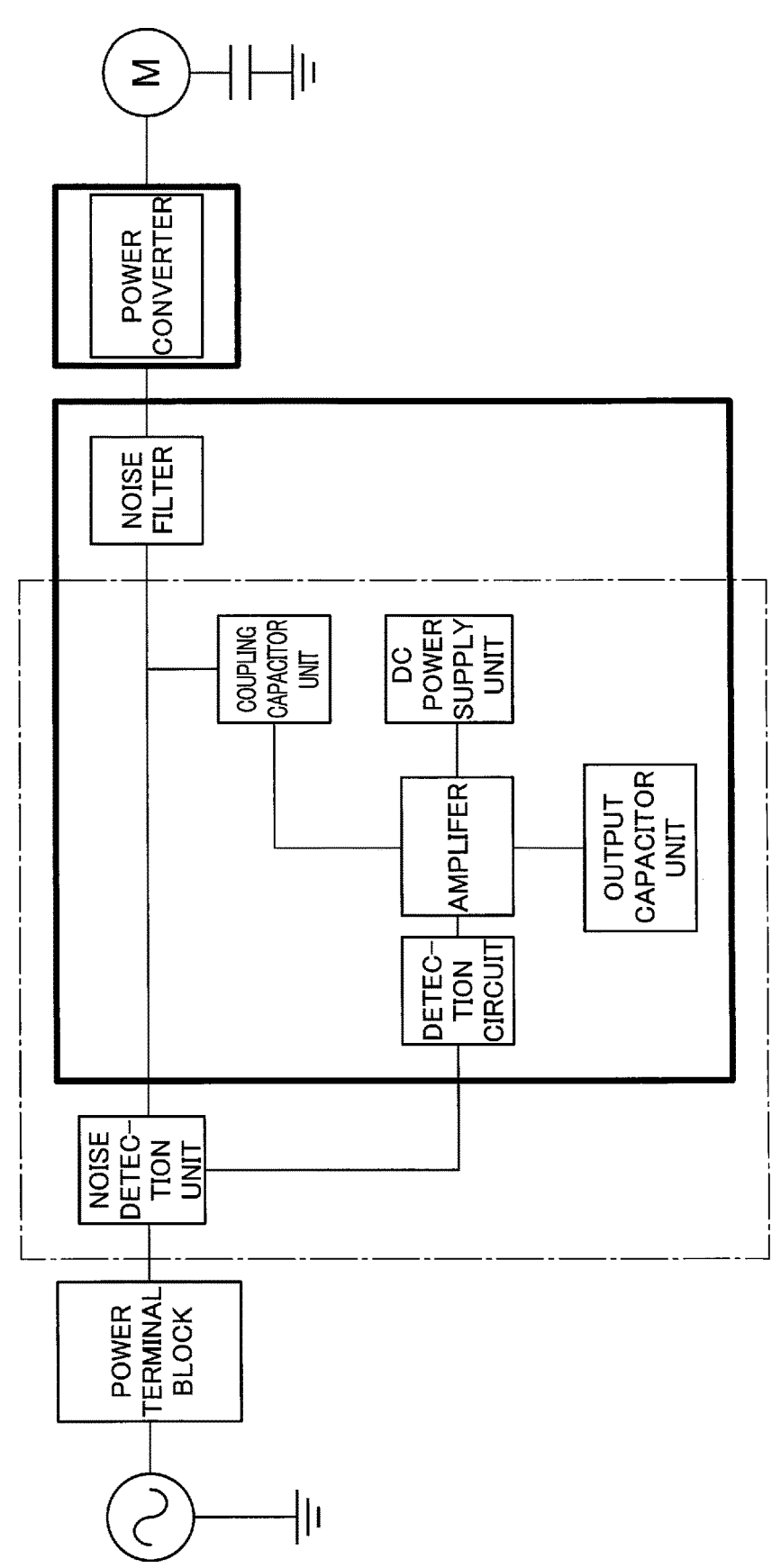
FIG. 7 illustrates a schematic configuration of a power conversion system according to a fifth embodiment.

FIG. 7 illustrates a schematic configuration of the power conversion system 5 according to the fifth embodiment.

In the fifth embodiment, instead of the canceler board 520 carrying the detection circuit 34, the amplifier 35, and the output capacitor unit 36, a canceler board 530 is provided that further carries the coupling capacitor unit 32, the DC power supply unit 33, and the noise filter 40, as shown in the figure.

In this manner, the arrangement of the fifth embodiment can shorten the wires between the power lines and the coupling capacitor unit 32 and between the coupling capacitor unit 32 and the amplifier 35, which can reduce the impedance of the compensation path.

While the figure depicts the DC power supply unit 33, the detection circuit 34, and the output capacitor unit 36 as being mounted on the canceler board 530, the DC power supply unit 33, the detection circuit 34, and the output capacitor unit 36 need not be mounted on the canceler board 530. At least the coupling capacitor unit 32, the amplifier 35, and the noise filter 40 may be mounted on the canceler board 530.

Sixth Embodiment

The circuit configuration of a power conversion system 6 according to a sixth embodiment is the same as that of the power conversion system 1 according to the first embodiment.

Figure 8:
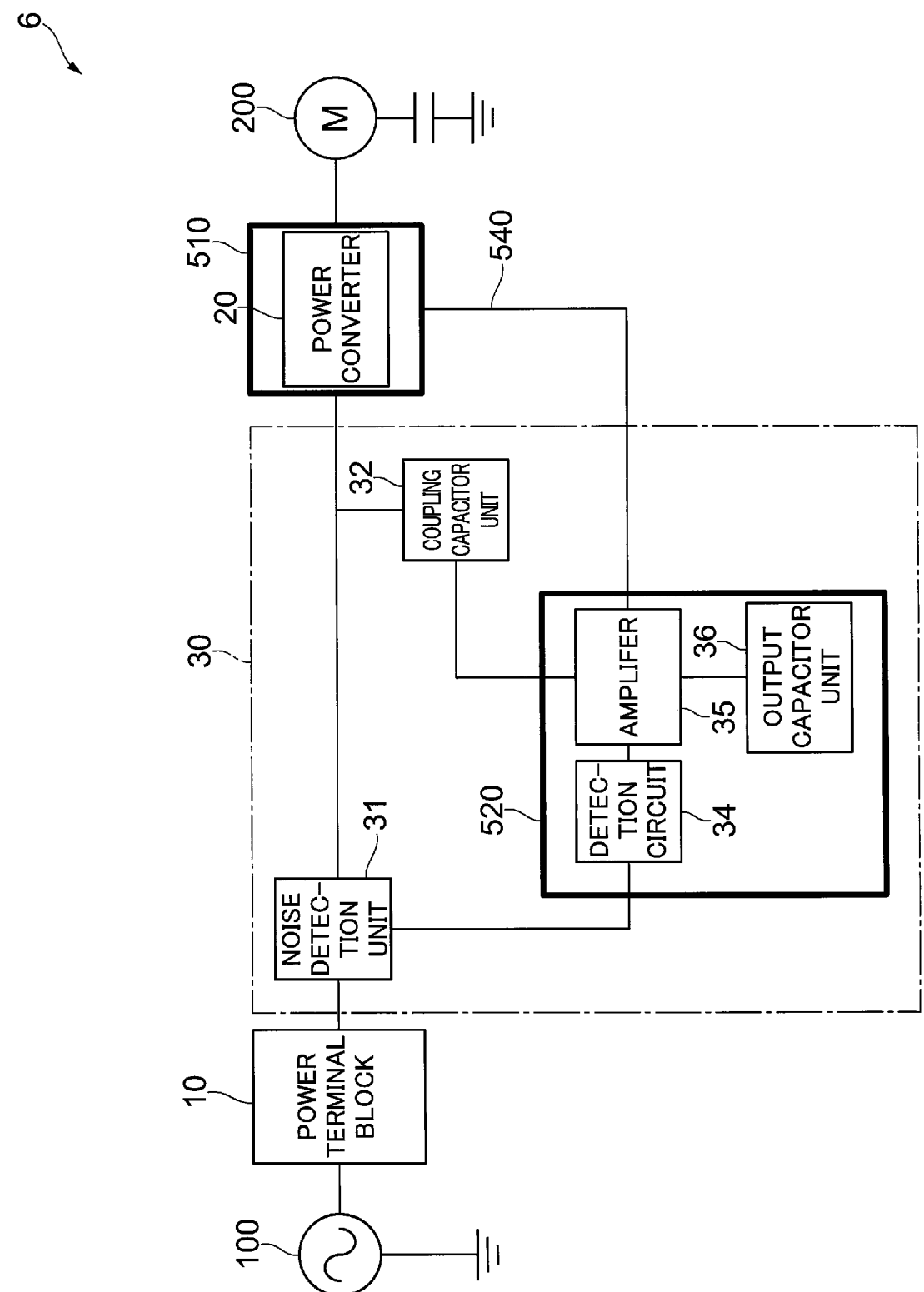
FIG. 8 illustrates a schematic configuration of a power conversion system according to a sixth embodiment.

FIG. 8 illustrates a schematic configuration of the power conversion system 6 according to the sixth embodiment.

In the sixth embodiment, a power supply harness 540 is provided between the power conversion board 510 and the canceler board 520, as shown in the figure. The power supply harness 540 supplies power from a switching power supply of the power conversion board 510 to the canceler board 520.

In this manner, the arrangement of the sixth embodiment can supply power to the canceler board 520 using the power circuit used in the power converter 20, which leads to reduced costs.

The power supply to the canceler board 520 may be provided from any other board than the power conversion board 510.

Seventh Embodiment

The circuit configuration of a power conversion system 7 according to a seventh embodiment is the same as that of the power conversion system 2 according to the second embodiment.

Figure 9:
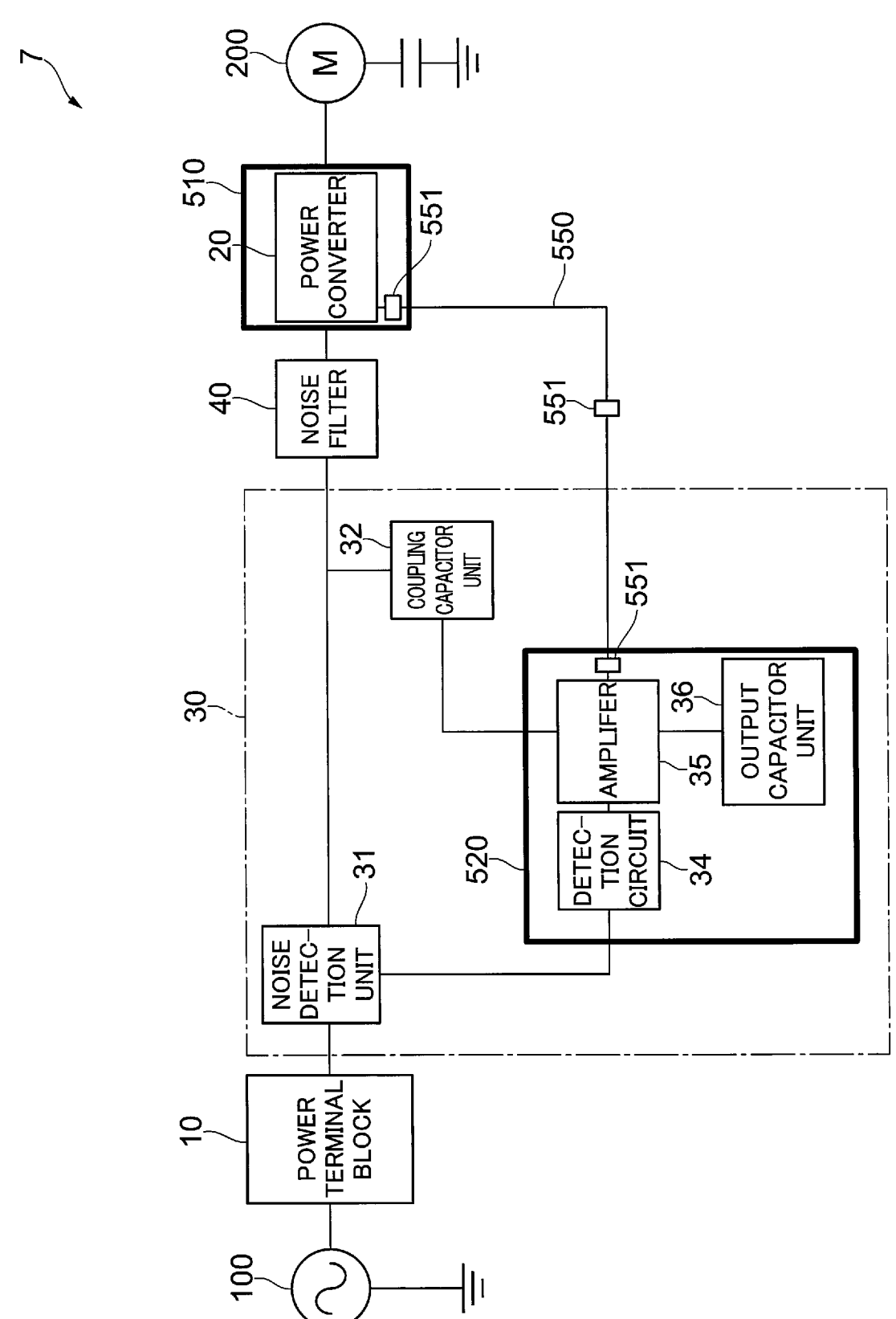
FIG. 9 illustrates a schematic configuration of a power conversion system according to a seventh embodiment.

FIG. 9 illustrates a schematic configuration of the power conversion system 7 according to the seventh embodiment.

In the arrangement of the seventh embodiment, too, a power supply harness 550 is provided between the power conversion board 510 and the canceler board 520, as shown in the figure. The power supply harness 550 supplies power from a switching power supply of the power conversion board 510 to the canceler board 520.

However, if the canceler board 520 is located opposite the power conversion board 510 with respect to the noise filter 40, the power supply harness 550 will connect the AC power supply 100-side circuit and the power converter 20-side circuit with respect to the noise filter 40. This will form a path with a lower impedance than the noise filter 40, resulting in noise from the power converter 20 flowing out toward the AC power supply 100 through the power supply harness 550. Therefore, in the seventh embodiment, noise reduction elements 551 are provided on the power supply harness 550. The noise reduction element 551 may be, for example, a ferrite core.

Thus, the arrangement of the seventh embodiment can inhibit the outflow of the switching noise of the power converter 20 to the outside through the noise canceler.

The power supply to the canceler board 520 may be provided from any other board than the power conversion board 510.

Refrigeration Apparatus

Figure 10:
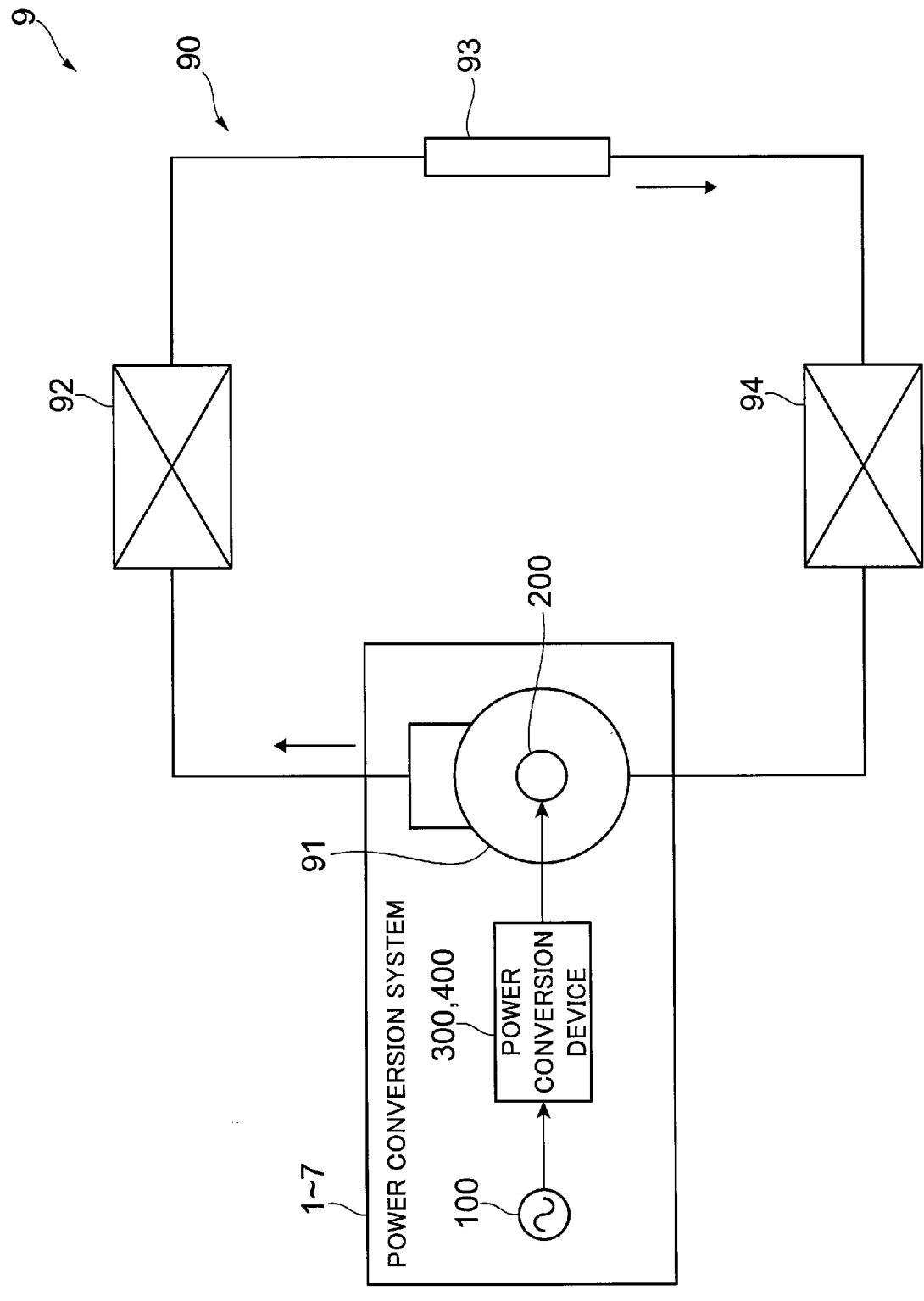
FIG. 10 illustrates an example piping system of a refrigeration apparatus according to certain embodiments.

FIG. 10 illustrates an example piping system of a refrigeration apparatus 9 according to certain embodiments. The refrigeration apparatus 9 circulates refrigerant in a refrigerant circuit to perform a refrigeration cycle. In the refrigerant circuit 90, a compressor 91, a condenser 92, an expansion mechanism 93, and an evaporator 94 are sequentially connected by piping, as shown in the figure.

The compressor 91 compresses low-pressure gas refrigerant and discharges high-pressure gas refrigerant using power from the motor 200. The motor 200 is included in the power conversion systems 1-7 in the first through seventh embodiments, and the power conversion devices 300, 400 drive the motor 200 using the AC power supply 100 as the power source.

The condenser 92 condenses the high-pressure gas refrigerant discharged from the compressor 91 and discharges high-pressure liquid refrigerant. The expansion mechanism 93 expands the high-pressure liquid refrigerant discharged from the condenser 92 and discharges low-pressure refrigerant in a gas-liquid mixed phase. The evaporator 94 evaporates the liquid refrigerant in the expanded low-pressure refrigerant in the gas-liquid mixed phase discharged from the expansion mechanism 93 and discharges low-pressure gas refrigerant.

Functions and Effects of Embodiments

In certain embodiments, the power conversion devices 300, 400 include: the power converter 20 using a switching element; and the noise reduction circuit 30, the noise reduction circuit 30 including: the noise detection unit 31 configured to detect a common mode noise current or a common mode noise voltage generated in the power lines in response to operation of the power converter 20; the amplifier 35 configured to generate a compensation current based on a detection signal from the noise detection unit 31; and the coupling capacitor unit 32 configured to output the compensation current generated by the amplifier 35 to the power lines. The power conversion board 510 carrying the power converter 20 and the canceler board 520 carrying the amplifier 35 are different boards.

These power conversion devices 300, 400 can inhibit degradation of the compensation performance for common mode noise that may otherwise be caused by switching noise of the power converter riding on the common mode noise detection signal.

In certain embodiments, the power conversion devices 300, 400 may include the power terminal block 10 for connection to the AC power supply 100, and the noise detection unit 31 may be located closer to the power terminal block 10 than to the power conversion board 510.

This arrangement increases the effect of common mode noise compensation.

In certain embodiments, the power conversion devices 300, 400 may include the power terminal block 10 for connection to the AC power supply 100, and the canceler board 520 may be located closer to the power terminal block 10 than to the power conversion board 510.

This arrangement can compensate for common mode noise while reducing the influence of heat from the power converter 20.

In certain embodiments, the power conversion device 400 may include the noise filter 40 between the noise reduction circuit 30 and the power converter 20.

This arrangement can reduce switching noise from the power converter 20.

In certain embodiments, the power conversion device 400 may include the housing 600 accommodating the power conversion board 510 and the canceler board 520 and including a ground terminal for connection to a ground wire and a conductive portion having the same potential as the ground terminal, and a compensation path connection terminal, which is a terminal for output of compensation current from the noise reduction circuit 30, and a ground terminal of the noise filter 40 may be separately connected to the conductive portion of the housing 600.

This arrangement can inhibit entry of noise from the current collected by the noise filter 40 into the compensation current.

In certain embodiments, the terminal on the housing 600 for connection to the compensation path connection terminal may be located closer to the ground terminal of the housing 600 than the terminal on the housing 600 for connection to the ground terminal of the noise filter 40 is.

This arrangement can reduce the impedance of the compensation path.

In certain embodiments, other power converters 20a, 20b, . . . may be connected to the load side of the noise filter 40 in parallel with the power converter 20.

This arrangement can cancel switching noise from these other power converters 20a, 20b, . . . all together.

In certain embodiments, the noise filter 40 may be mounted on the canceler board 530.

This arrangement can reduce the impedance of the compensation path.

In certain embodiments, the power supply for the noise reduction circuit 30 may be supplied from the power conversion board 510 to the canceler board 520, and the noise reduction elements 551 may be provided on the power supply path.

This arrangement can inhibit the outflow of switching noise of the power converter 20 to the outside through the noise canceler.

In certain embodiments, the power supply for the noise reduction circuit 30 may be supplied from the power conversion board 510 to the canceler board 520.

This arrangement can reduce the cost of operating the noise reduction circuit 30.

In certain embodiments, the noise detection unit 31 may be a detection core configured to detect the common mode noise current.

This arrangement can directly amply the detected common mode noise current to compensate for the common mode noise.

In certain embodiments, the refrigeration apparatus 9 includes any of the above power conversion devices 300, 400.

This refrigeration apparatus 9 can inhibit degradation of compensation performance for common mode noise that may otherwise be caused by the switching noise of the power converter 20 riding on the common mode noise detection signal.

While certain embodiments have been described above, it will be understood that various changes in form and detail can be made without departing from the spirit and scope of the invention as defined by the appended claims.

REFERENCE SIGNS LIST

1-7 Power conversion system
10 Power terminal block
20 Power converter
21 Rectifier unit
23 Inverter unit
30 Noise reduction circuit
31 Noise detection unit
32 Coupling capacitor unit
33 DC power supply unit
34 Detection circuit
35 Amplifier
36 Output capacitor unit
40 Noise filter
100 AC power supply
200 Motor
300, 400 Power conversion device
510 Power conversion board
520, 530 Canceler board
540, 550 Power supply harness
551 Noise reduction element
600 Housing
The invention claimed is:

1. A power conversion device comprising:
a power converter using a switching element; and
a noise reduction circuit, the noise reduction circuit comprising:
    a noise detector configured to detect a common mode noise current or a common mode noise voltage generated in a power line in response to operation of the power converter;

an amplifier configured to generate a compensation current based on a detection signal from the noise detector; and
    an output circuit configured to output the compensation current generated by the amplifier to the power line, wherein
a power conversion board carrying the power converter and a canceler board carrying the amplifier are different boards.

2. The power conversion device according to claim 1, further comprising a power terminal block for connection to an AC power supply, wherein
    the noise detector is located closer to the power terminal block than to the power conversion board.

3. The power conversion device according to claim 1, further comprising a power terminal block for connection to an AC power supply, wherein
    the canceler board is located closer to the power terminal block than to the power conversion board.

4. The power conversion device according to claim 1, further comprising a noise filter between the noise reduction circuit and the power converter.

5. The power conversion device according to claim 4, further comprising a housing accommodating the power conversion board and the canceler board, the housing including a ground terminal for connection to a ground wire and a conductive portion having a same potential as the ground terminal, wherein
    a compensation path connection terminal, which is a terminal for output of a compensation current from the noise reduction circuit, and a ground terminal of the noise filter are separately connected to the conductive portion of the housing.

6. The power conversion device according to claim 5, wherein a terminal on the housing for connection to the compensation path connection terminal is located closer to the ground terminal of the housing than a terminal on the housing for connection to the ground terminal of the noise filter is.

7. The power conversion device according to claim 4, wherein another power converter is connected to a load side of the noise filter in parallel with the power converter.

8. The power conversion device according to claim 4, wherein the noise filter is mounted on the canceler board.

9. The power conversion device according to claim 4, wherein power supply for the noise reduction circuit is supplied from another board to the canceler board, and a noise reduction element is provided on a path for the power supply.

10. The power conversion device according to claim 1, wherein power supply for the noise reduction circuit is supplied from another board to the canceler board.

11. The power conversion device according to claim 1, wherein the noise detector is a detection core configured to detect the common mode noise current.

12. A refrigeration apparatus comprising the power conversion device according to claim 1.

* * * * *